United States Patent
Tzikas et al.

(10) Patent No.: US 7,553,340 B2
(45) Date of Patent: Jun. 30, 2009

(54) REACTIVE DYES, A PROCESS FOR THEIR PREPARATION AND THEIR USE

(75) Inventors: Athanassios Tzikas, Pratteln (CH); Georg Roentgen, Freiburg (DE); Herbert Klier, Efringen-Kirchen (DE)

(73) Assignee: Huntsman International, LLC, The Woodlands, TX (US)

( * ) Notice: Subject to any disclaimer, the term of this patent is extended or adjusted under 35 U.S.C. 154(b) by 235 days.

(21) Appl. No.: 11/667,616

(22) PCT Filed: Nov. 2, 2005

(86) PCT No.: PCT/EP2005/055689

§ 371 (c)(1), (2), (4) Date: May 11, 2007

(87) PCT Pub. No.: WO2006/051053

PCT Pub. Date: May 18, 2006

(65) Prior Publication Data

US 2007/0294842 A1    Dec. 27, 2007

(30) Foreign Application Priority Data

Nov. 12, 2004 (EP) .................................. 04105730

(51) Int. Cl.
*C09B 67/22* (2006.01)
*C07C 245/00* (2006.01)

(52) U.S. Cl. ........................ 8/641; 8/669; 8/673; 8/681; 8/687; 8/688; 534/567

(58) Field of Classification Search .................. 8/641, 8/669, 673, 681, 687, 688; 534/567
See application file for complete search history.

(56) References Cited

U.S. PATENT DOCUMENTS 4,845,203 A * 7/1989 Dietz et al. ................. 534/637
5,116,956 A    5/1992 Miyamoto et al.
5,820,661 A * 10/1998 Gregory et al. .......... 106/31.48

FOREIGN PATENT DOCUMENTS

EP    0261079 A    3/1988
EP    0400647 A    10/1998

OTHER PUBLICATIONS

STIC Structure Search, completed Feb. 25, 2009.*

* cited by examiner

*Primary Examiner*—Eisa B Elhilo
*Assistant Examiner*—Katie Hammer

(57) ABSTRACT

Reactive dyes of formula (1) wherein $R_1$ is hydrogen or unsubstituted or substituted $C_1$-$C_4$alkyl, $R_2$ is hydrogen; $C_1$-$C_4$alkyl; $C_1$-$C_4$alkoxy unsubstituted or substituted by sulfato, hydroxy or by $C_1$-$C_4$alkoxy; halogen; carboxy or sulfo, $R_3$ is hydrogen; $C_1$-$C_4$alkyl; $C_1$-$C_4$alkoxy unsubstituted or substituted by sulfato, hydroxy or by $C_1$-$C_4$alkoxy; halogen; nitro; $C_2$-$C_4$alkanoylamino; ureido; carboxy or sulfo, $(R_4)_k$ denotes k identical or different substituents selected from the group halogen, $C_1$-$C_4$-alkyl, $C_1$-$C_4$alkoxy, carboxy and sulfo, X is halogen and V is a radical of formula (2a), 2(b) wherein $R_5$ is unsubstituted or substituted $C_1$-$C_4$alkyl, $(R_6)_l$ denotes l identical or different substituents from the group $C_1$-$C_4$alkyl, $C_1$-$C_4$alkoxy and sulfo, and l is the number 0, 1 or 2, Y is vinyl or a —$CH_2$—$CH_2$—U radical and U is a group that is removable under alkaline conditions, Q is a —CH(Hal)-$CH_2$-Hal or —C(Hal)=$CH_2$ group, Hal is halogen and k is the number 0, 1, 2 or 3, are suitable especially for dyeing cotton and yield dyeings having good all-round fastness properties.

11 Claims, No Drawings

REACTIVE DYES, A PROCESS FOR THEIR PREPARATION AND THEIR USE

CROSS REFERENCE TO RELATED APPLICATIONS

This application is the National Phase of International Application PCT/EP2005/055689 filed Nov. 2, 2005 which designated the U.S. and which claims priority to European Pat. App. No. 04105730.8 filed Nov. 12, 2004. The noted applications are incorporated herein by reference.

The present invention relates to novel reactive dyes, to a process for their preparation and to their use in the dyeing or printing of textile fibre materials.

The practice of dyeing using reactive dyes has recently led to higher demands being made on the quality of the dyeings and the economic efficiency of the dyeing process. As a result, there continues to be a need for novel reactive dyes having improved properties, especially in respect of their application.

Dyeing nowadays requires reactive dyes that have sufficient substantivity and at the same time have good ease of washing off of unfixed dye. They should also have a good colour yield and high reactivity, the objective being to provide especially dyeings having high degrees of fixing and good fastness properties. The known dyes do not satisfy those requirements in all properties.

The dyes known from U.S. Pat. No. 4,645,832 still have certain disadvantages in respect of the required properties.

The problem underlying the present invention is accordingly to find, for the dyeing and printing of fibre materials, novel improved reactive dyes having the qualities characterised above to a high degree. The novel dyes should be distinguished especially by high fixing yields and high fibre-dye binding stabilities. The dyes should furthermore yield dyeings having good allround fastness properties, for example fastness to light and to wetting.

It has been found that the problem posed is largely solved by the novel dyes defined hereinbelow.

The present invention accordingly relates to reactive dyes of formula

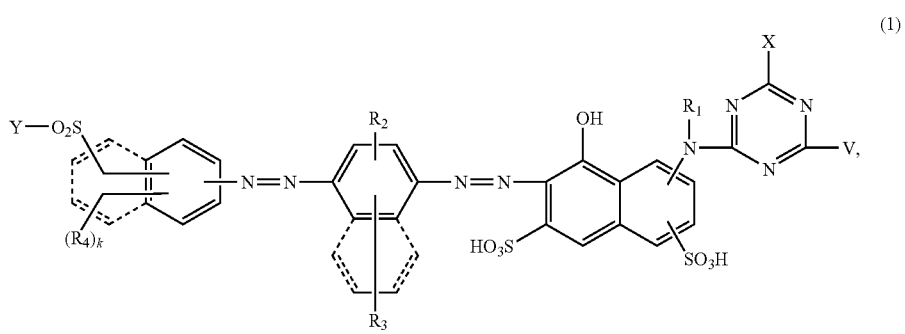

(1)

wherein $R_1$ is hydrogen or unsubstituted or substituted $C_1$-$C_4$alkyl, $R_2$ is hydrogen; $C_1$-$C_4$alkyl; $C_1$-$C_4$alkoxy unsubstituted or substituted by sulfato, hydroxy or by $C_1$-$C_4$alkoxy; halogen; carboxy or sulfo, $R_3$ is hydrogen; $C_1$-$C_4$alkyl; $C_1$-$C_4$alkoxy unsubstituted or substituted by sulfato, hydroxy or by $C_1$-$C_4$alkoxy; halogen; nitro; $C_2$-$C_4$alkanoylamino; ureido; carboxy or sulfo, $(R_4)_k$ denotes k identical or different substituents selected from the group halogen, $C_1$-$C_4$-alkyl, $C_1$-$C_4$alkoxy, carboxy and sulfo, X is halogen and V is a radical of formula

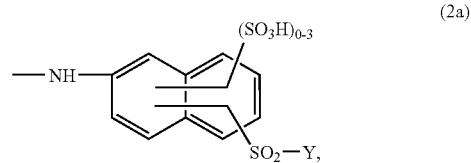

(2a)

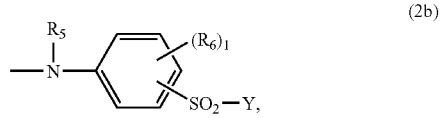

(2b)

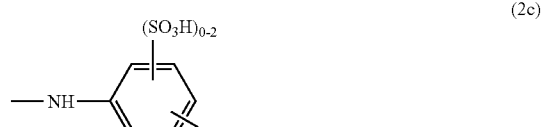

(2c)

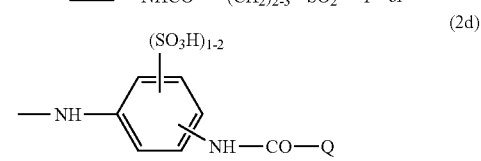

(2d)

wherein $R_5$ is unsubstituted or substituted $C_1$-$C_4$alkyl, $(R_6)_l$ denotes l identical or different substituents from the group $C_1$-$C_4$alkyl, $C_1$-$C_4$alkoxy and sulfo, and l is the number 0, 1 or 2, Y is vinyl or a —$CH_2$—$CH_2$—U radical and U is a group that is removable under alkaline conditions, Q is a —CH(Hal)-$CH_2$-Hal or —C(Hal)=$CH_2$ group, Hal is halogen and k is the number 0, 1, 2 or 3.

As $C_1$-$C_4$alkyl there comes into consideration for $R_1$, $R_2$, $R_3$, $R_4$, $R_5$ and $R_6$, each independently of any other(s), for example, methyl, ethyl, n-propyl, isopropyl, n-butyl, sec-butyl, tert-butyl or isobutyl, preferably methyl or ethyl. The mentioned alkyl radicals $R_1$ and $R_5$ are unsubstituted or substituted, for example, by hydroxy, sulfo, sulfato, cyano or by carboxyl. The corresponding unsubstituted alkyl radicals are preferred.

As $C_1$-$C_4$alkoxy there comes into consideration for $R_2$, $R_3$, $R_4$ and $R_6$, each independently of any other(s), for example, methoxy, ethoxy, n-propoxy, isopropoxy, n-butoxy, sec-butoxy, tert-butoxy or isobutoxy, preferably methoxy or ethoxy and especially methoxy. The mentioned alkoxy radicals $R_2$ and $R_3$ are unsubstituted or substituted, for example, by sulfato, hydroxy or by $C_1$-$C_4$alkoxy, for example by methoxy or ethoxy. The respective unsubstituted alkoxy radicals are preferred.

As halogen there comes into consideration for $R_2$, $R_3$ and $R_4$, each independently of any others, for example, fluorine, chlorine or bromine, preferably chlorine or bromine and especially chlorine.

As $C_2$-$C_4$alkanoylamino there comes into consideration for $R_3$, for example, acetylamino or propionylamino, especially acetylamino.

For X, there comes into consideration, for example, fluorine, chlorine or bromine, preferably fluorine or chlorine and especially chlorine.

As leaving group U there comes into consideration, for example, —Cl, —Br, —F, —$OSO_3H$, —$SSO_3H$, —OCO—$CH_3$, —$OPO_3H_2$, —OCO—$C_6H_5$, —$OSO_2$—$C_1$-$C_4$alkyl or —$OSO_2$—N($C_1$-$C_4$alkyl)$_2$. Preferably, U is a group of formula —Cl, —$OSO_3H$, —$SSO_3H$, —OCO—$CH_3$, —OCO—$C_6H_5$ or —$OPO_3H_2$, especially —Cl or —$OSO_3H$.

Examples of suitable radicals Y are accordingly vinyl, β-bromo- or β-chloro-ethyl, β-acetoxyethyl, β-benzoyloxyethyl, β-phosphatoethyl, β-sulfatoethyl and β-thiosulfatoethyl. Y is preferably vinyl, β-chloroethyl or β-sulfatoethyl and especially vinyl or β-sulfatoethyl.

Preferably, $R_1$ is hydrogen or $C_1$-$C_4$alkyl, especially hydrogen.

Preferably, $R_2$ is hydrogen, $C_1$-$C_4$alkyl, $C_1$-$C_4$alkoxy or sulfo, especially hydrogen, $C_1$-$C_4$alkyl or $C_1$-$C_4$alkoxy and more especially methoxy.

Preferably, $R_3$ is hydrogen, $C_1$-$C_4$alkyl, $C_1$-$C_4$alkoxy, $C_2$-$C_4$alkanoylamino, ureido or sulfo, especially hydrogen, $C_1$-$C_4$alkyl, $C_1$-$C_4$alkoxy, ureido or $C_2$-$C_4$alkanoylamino and more especially methoxy.

Preferably, $(R_4)_k$ denotes k identical or different substituents from the group $C_1$-$C_4$alkyl, $C_1$-$C_4$alkoxy and sulfo, especially methyl, methoxy and sulfo, and more especially sulfo.

k is preferably the number 0, 1 or 2, especially the number 1.

$R_4$ is especially preferably a sulfo group.

Preferably, $R_5$ is $C_1$-$C_4$alkyl, especially methyl or ethyl and more especially ethyl.

Preferably, $(R_6)_l$ denotes l identical or different substituents from the group methyl, methoxy and sulfo.

l is preferably the number 0.

$R_6$ is especially preferably hydrogen.

Hal in the fibre-reactive radical of formula (2d) is preferably chlorine or bromine, especially bromine.

Especially preferably, V is a radical of the above formula (2b) or (2c), especially of the above formula (2b), $R_5$, $(R_6)_l$, wherein Y and l each have the definitions and preferred meanings given above.

The radical of formula (2b) is preferably a radical of formula

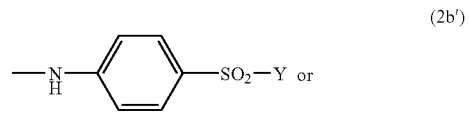

(2b′)

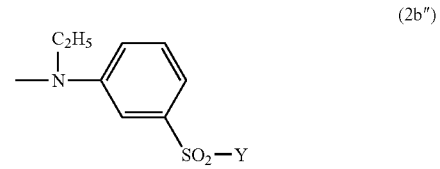

(2b″)

wherein Y has the definitions and preferred meanings given above.

In a preferred embodiment of the present invention, the reactive dye of formula (1) is a reactive dye of formula

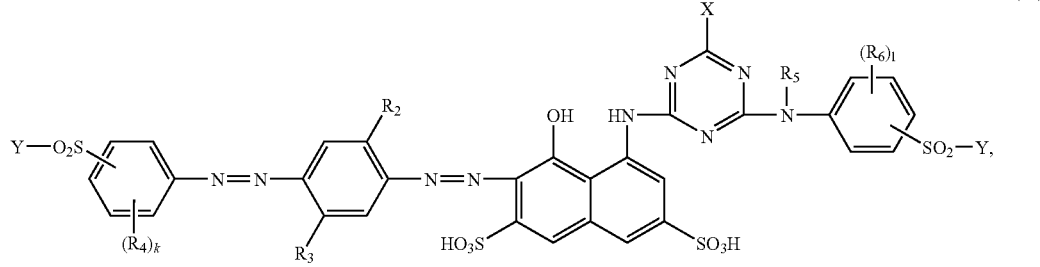

(1a)

wherein $R_2$, $R_3$, $(R_4)_k$, $R_5$, $(R_6)_l$, X, Y, k and l each have the definitions and preferred meanings given above.

In an especially preferred embodiment of the present invention, the reactive dye of formula (1) is a reactive dye of formula

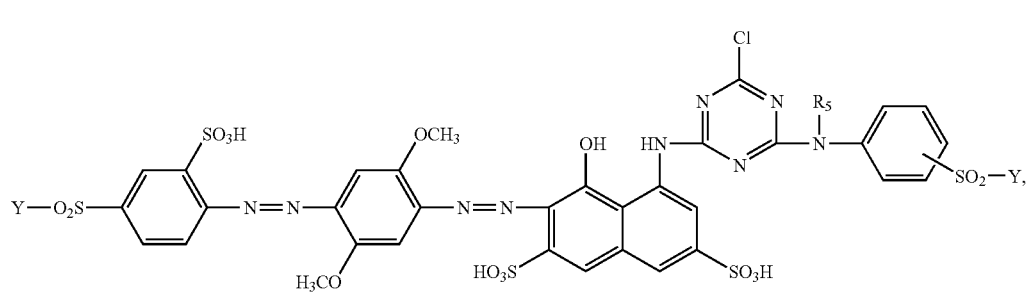
(1aa)

wherein $R_5$ and Y each have the definitions and preferred meanings given above.

The present invention relates also to a process for the preparation of the reactive dyes according to the invention wherein (i) The Compounds of Formulae

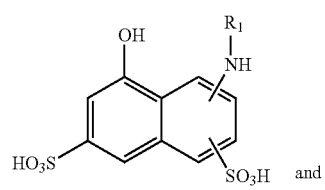 and $$V-H \quad (5)$$

are reacted in any order with a cyanuric halide of formula

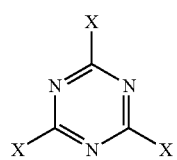

to form a secondary condensation product of formula

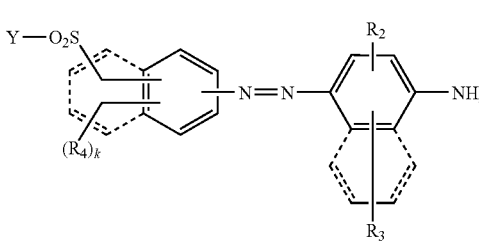

and (ii) A Compound of Formula

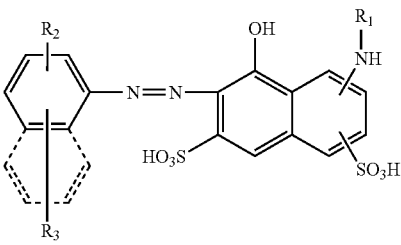

is diazotized and coupled to the secondary condensation product of formula (7) obtained according to (i); or (iii) The Compounds of Formula

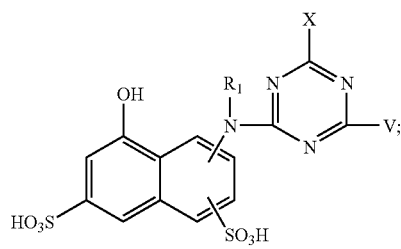

and of the above formula (5) are reacted in any order with a cyanuric halide of the above formula (6) to form a secondary condensation product of formula

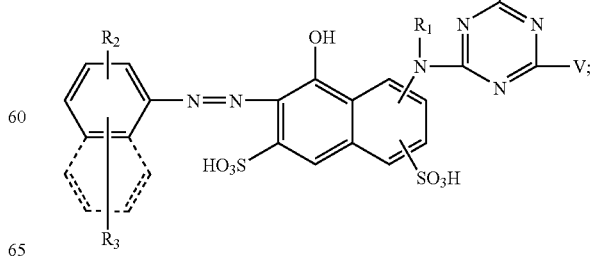

and (iv) A Compound of Formula

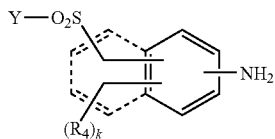
(11)

is diazotized and coupled to the secondary condensation product of formula (10) obtained according to (iii), $R_1$, $R_2$, $R_3$, $(R4)_k$, V, X, Y and k each having the definitions and preferred meanings given above.

A suitable cyanuric halide is, for example, cyanuric chloride or cyanuric fluoride, especially cyanuric chloride.

Since the above process steps (i) and (iii) can be carried out in a different order, and also, if desired, can be carried out simultaneously, various process variants are possible. In general, the reaction is carried out stepwise, the order in which the single reactions between the individual reactants are carried out advantageously being governed by the particular conditions. For example, approximately one molar equivalent of an amine of formula (4) or (9) is reacted with approximately one molar equivalent of cyanuric halide of formula (6) and the resulting primary condensation product is then condensed with approximately one molar equivalent of a compound of formula (5). In another process variant, for example, approximately one molar equivalent of a compound of formula (5) is reacted with approximately one molar equivalent of cyanuric halide of formula (6) and the resulting primary condensation product is then condensed with approximately one molar equivalent of an amine of formula (4) or (9).

In the further course of the process, preparation of the reactive dye is completed according to (ii) by diazotization of the amine of formula (8) and subsequent coupling to the secondary condensation product of formula (7); or according to (iv) by diazotization of the amine of formula (11) and subsequent coupling to the secondary condensation product of formula (10).

The individual condensation reactions are carried out, for example, according to processes known per se, usually in aqueous solution, at a temperature of, for example, from 0 to 50° C., especially from 0 to 10° C., and at a pH value of, for example, from 3 to 10, especially from 3 to 7.

Diazotization and coupling are carried out, for example, by diazotizing the compound of formula (8) or (11) in mineral acid-containing solution, for example hydrochloric acid-containing solution, with a nitrite, for example sodium nitrite, for example at from 10 to 60° C., and then coupling to the corresponding coupling component of formula (7) or (10) in neutral to slightly acidic medium, for example at pH from 3 to 8, preferably from 4.5 to 7.5, and at low temperatures, for example from 0 to 30° C.

The end product can optionally, in addition, be subjected to a conversion reaction. Such a conversion reaction is, for example, the conversion of a vinylatable reactive group Y or Q into its vinyl form by treatment with dilute sodium hydroxide solution, such as, for example, the conversion of the β-sulfatoethylsulfonyl or β-chloroethylsulfonyl group into the vinylsulfonyl radical or the conversion of the α,β-dihalopropionylamino group into the α-haloacryloylamino radical. Such reactions are known per se. The conversion reaction is generally carried out in neutral to alkaline medium at a temperature of, for example, from 20 to 70° C., at a pH value of, for example, from 6 to 14.

The compounds of formulae (4), (5), (8), (9) and (11) are known or can be prepared analogously to known compounds.

The reactive dyes of formula (1) according to the invention are either in the form of the free acid or, preferably, in the form of a salt thereof. Salts that come into consideration are, for example, the alkali metal, alkaline earth metal and ammonium salts or the salts of an organic amine. Sodium, lithium, potassium and ammonium salts and the salts of mono-, di- and tri-ethanolamine may be mentioned as examples.

The compounds of formula (1) according to the invention are suitable as dyes for dyeing and printing an extremely wide variety of materials, such as hydroxyl-group-containing or nitrogen-containing fibre materials. Examples of nitrogen-containing fibre materials that may be mentioned are silk, leather, wool, polyamide fibres and polyurethanes. The reactive dyes according to the invention are suitable especially for dyeing and printing cellulosic fibre materials of all kinds. Such cellulosic fibre materials are, for example, natural cellulosic fibres, such as cotton, linen and hemp, and also cellulose and regenerated cellulose, preferably cotton. The reactive dyes according to the invention are also suitable for dyeing or printing cellulosic blend fabrics, for example blends of cotton and polyamide fibres or especially blends of cotton and polyester fibres.

The reactive dyes according to the invention can be applied to the fibre material and fixed to the fibre in a variety of ways, especially in the form of aqueous dye solutions and print pastes. They are suitable both for the exhaust method and for dyeing in accordance with the pad-dyeing method, according to which the goods are impregnated with aqueous, optionally salt-containing, dye solutions and, after treatment with alkali or in the presence of alkali, the dyes are fixed, where appropriate with the action of heat or by storing for several hours at room temperature. After fixing, the dyeings or prints are rinsed thoroughly with cold and hot water, optionally with the addition of an agent that has a dispersing action and promotes the diffusion of unfixed dye.

The reactive dyes according to the invention are distinguished by high reactivity, good fixing ability and a very good build-up behaviour. They can accordingly be used in accordance with the exhaust dyeing method at low dyeing temperatures and require only short steaming times in the pad-steam method. The degrees of fixing are high and unfixed dye can be washed off easily, the difference between the degree of exhaust and the degree of fixing being remarkably small, that is to say the soaping loss being very low. The dyes according to the invention are also suitable especially for printing, more especially on cotton, but are equally suitable also for printing nitrogen-containing fibres, for example wool or silk or blend fabrics that include wool or silk.

The dyeings and prints produced using the reactive dyes according to the invention have a high tinctorial strength and a high fibre-dye binding stability in both the acidic and the alkaline range, and furthermore have good fastness to light and very good wet-fastness properties, such as fastness to washing, to water, to sea water, to cross-dyeing and to perspiration, as well as good fastness to chlorine, to pleating, to hot-pressing and to rubbing.

The dyes of formula (1) according to the invention are also suitable as colorants for use in recording systems. Such recording systems are, for example, commercially available ink-jet printers for paper or textile printing, or writing instruments, such as fountain pens or ballpoint pens, and especially ink-jet printers. For that purpose, the dyes according to the invention are first brought into a form suitable for use in recording systems. A suitable form is, for example, an aqueous ink, which comprises the dyes according to the invention as colorants. The inks can be prepared in customary manner by mixing together the individual components in the desired amount of water.

As substrates there come into consideration the above-mentioned hydroxyl-group-containing or nitrogen-containing fibre materials, especially natural or synthetic polyamide fibre materials. The fibre materials are preferably textile fibre materials.

Substrates that also come into consideration are paper and plastics films.

As examples of paper there may be mentioned commercially available ink-jet paper, photo paper, glossy paper, plastics-coated paper, e.g. Epson Ink-jet Paper, Epson Photo Paper, Epson Glossy Paper, Epson Glossy Film, HP Special Ink-jet Paper, Encad Photo Gloss Paper and Ilford Photo Paper. Plastics films are, for example, transparent or cloudy/opaque. Suitable plastics films are, for example, 3M Transparency Film.

Depending on the nature of the use, for example textile printing or paper printing, it may be necessary, for example, for the viscosity or other physical properties of the ink, especially properties that have an influence on the affinity for the substrate in question, to be adapted accordingly.

The dyes used in the aqueous inks should preferably have a low salt content, that is to say they should have a total content of salts of less than 0.5% by weight, based on the weight of the dyes. Dyes that have relatively high salt contents as a result of their preparation and/or as a result of the subsequent addition of diluents can be desalted, for example by membrane separation procedures, such as ultrafiltration, reverse osmosis or dialysis.

The inks preferably have a total content of dyes of from 1 to 35% by weight, especially from 1 to 30% by weight and preferably from 1 to 20% by weight, based on the total weight of the ink. The preferred lower limit in this case is a limit of 1.5% by weight, preferably 2% by weight and especially 3% by weight.

The inks may comprise water-miscible organic solvents, for example $C_1$-$C_4$ alcohols, e.g. methanol, ethanol, n-propanol, isopropanol, n-butanol, sec-butanol, tert-butanol or iso-butanol; amides, e.g. dimethylformamide or dimethylacetamide; ketones or ketone alcohols, e.g. acetone or diacetone alcohol; ethers, e.g. tetrahydrofuran or dioxane; nitrogen-containing heterocyclic compounds, e.g. N-methyl-2-pyrrolidone or 1,3-dimethyl-2-imidazolidone, polyalkylene glycols, e.g. polyethylene glycol or polypropylene glycol; $C_2$-$C_6$ alkylene glycols and thioglycols, e.g. ethylene glycol, propylene glycol, butylene glycol, triethylene glycol, thiodiglycol, hexylene glycol and diethylene glycol; other polyols, e.g. glycerol or 1,2,6-hexanetriol; and $C_1$-$C_4$ alkyl ethers of polyhydric alcohols, e.g. 2-methoxy-ethanol, 2-(2-methoxy-ethoxy)ethanol, 2-(2-ethoxyethoxy)ethanol, 2-[2-(2-methoxy-ethoxy)ethoxy]ethanol or 2-[2-(2-ethoxyethoxy)ethoxy]ethanol; preferably N-methyl-2-pyrrolidone, diethylene glycol, glycerol or especially 1,2-propylene glycol, usually in an amount of from 2 to 30% by weight, especially from 5 to 30% by weight and preferably from 10 to 25% by weight, based on the total weight of the ink.

In addition, the inks may also comprise solubilisers, e.g. ε-caprolactam.

The inks may comprise thickeners of natural or synthetic origin, inter alia for the purpose of adjusting the viscosity.

Examples of thickeners that may be mentioned include commercially available alginate thickeners, starch ethers or locust bean flour ethers, especially sodium alginate on its own or in admixture with modified cellulose, e.g. methyl cellulose, ethyl cellulose, carboxymethyl cellulose, hydroxyethyl cellulose, methyl hydroxyethyl cellulose, hydroxypropyl cellulose or hydroxypropyl methyl cellulose, especially with preferably from 20 to 25% by weight carboxymethyl cellulose. Synthetic thickeners that may also be mentioned are, for example, those based on poly(meth)acrylic acids or poly (meth)acrylamides and also polyalkylene glycols having a molecular weight of, for example, from 2000 to 20 000, such as, for example, polyethylene glycol or polypropylene glycol or mixed polyalkylene glycols of ethylene oxide and propylene oxide.

The inks contain such thickeners, for example, in an amount of from 0.01 to 2% by weight, especially from 0.01 to 1% by weight and preferably from 0.01 to 0.5% by weight, based on the total weight of the ink.

The inks may also comprise buffer substances, e.g. borax, borates, phosphates, poly-phosphates or citrates. Examples that may be mentioned include borax, sodium borate, sodium tetraborate, sodium dihydrogen phosphate, disodium hydrogen phosphate, sodium tripolyphosphate, sodium pentapolyphosphate and sodium citrate. They are used especially in amounts of from 0.1 to 3% by weight, preferably from 0.1 to 1% by weight, based on the total weight of the ink, in order to establish a pH value of, for example, from 4 to 9, especially from 5 to 8.5.

As further additives, the inks may comprise surfactants or humectants. Suitable surfactants include commercially available anionic or non-ionic surfactants. As humectants in the inks according to the invention there come into consideration, for example, urea or a mixture of sodium lactate (advantageously in the form of a 50% to 60% aqueous solution) and glycerol and/or propylene glycol in amounts of preferably from 0.1 to 30% by weight, especially from 2 to 30% by weight.

Preference is given to inks having a viscosity of from 1 to 40 mPa·s, especially from 1 to 20 mpa·s and more especially from 1 to 10 mpa·s.

Furthermore, the inks may in addition comprise customary additives, e.g. anti-foams or especially preservatives that inhibit fungal and/or bacterial growth. Such additives are usually used in amounts of from 0.01 to 1% by weight, based on the total weight of the ink.

As preservatives there come into consideration formaldehyde-yielding agents, for example paraformaldehyde and trioxane, especially aqueous, approximately from 30 to 40% by weight formaldehyde solutions, imidazole compounds, for example 2-(4-thiazolyl)-benzimidazole, thiazole compounds, for example 1,2-benzisothiazolin-3-one or 2-n-octyl-isothiazolin-3-one, iodine compounds, nitriles, phenols, haloalkylthio compounds or pyridine derivatives, especially 1,2-benzisothiazolin-3-one or 2-n-octyl-isothiazolin-3-one. A suitable preservative is, for example, a 20% by weight solution of 1,2-benzisothiazolin-3-one in dipropylene glycol (Proxel® GXL).

The inks may in addition comprise further additives, such as fluorinated polymers or telomers, for example polyethoxyperfluoroalcohols (Forafac® or Zonyl® products) in an amount of, for example, from 0.01 to 1% by weight, based on the total weight of the ink.

In the case of the ink-jet printing method, individual droplets of ink are sprayed onto a substrate from a nozzle in a controlled manner. It is mainly the continuous ink-jet method and the drop-on-demand method that are used for that purpose. In the case of the continuous ink-jet method, the droplets are produced continuously, droplets not required for the printing operation being discharged into a receptacle and recycled. In the case of the drop-on-demand method, on the other hand, droplets are generated as desired and used for printing; that is to say, droplets are generated only when required for the printing operation. The production of the droplets can be effected, for example, by means of a piezo ink-jet head or by thermal energy (bubble jet). Preference is given to printing by means of a piezo ink-jet head and to printing according to the continuous ink-jet method.

The present invention accordingly relates also to aqueous inks that comprise the dyes of formula (1) according to the invention and to the use of such inks in an ink-jet printing method for printing a variety of substrates, especially textile fibre materials, the definitions and preferences indicated above applying to the dyes, the inks and the substrates.

The following Examples serve to illustrate the invention. Unless otherwise indicated, the temperatures are given in degrees Celsius, parts are parts by weight and percentages relate to % by weight. Parts by weight relate to parts by volume in a ratio of kilograms to liters.

EXAMPLE 1

(a) 19 parts of cyanuric chloride are dispersed in 75 parts of ice and 75 parts of water with the addition of a wetting agent. A neutral solution of 32.0 parts of 1-amino-8-naphthol-3,6-disulfonic acid in 350 parts of water is added to the resulting dispersion. After a few hours, the pH value of the reaction mixture is adjusted to from 4 to 5.5 by adding aqueous sodium hydroxide solution.

(b) 31.0 parts of a compound which, in the form of the free acid, corresponds to formula

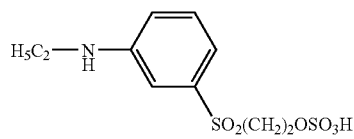

are dissolved in 500 parts of water. The solution so obtained is added dropwise in the course of 45 minutes to the solution obtained according to (a). During the addition, the pH value is maintained at 6 by means of 2N aqueous sodium hydroxide solution. Stirring is then carried out overnight at pH 6. The reaction solution comprises a compound which, in the form of the free acid, corresponds to formula

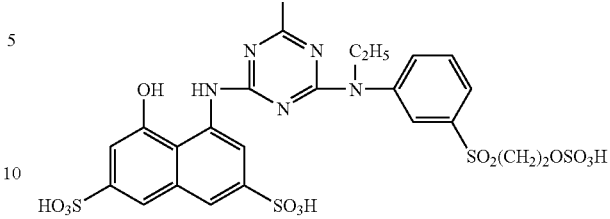

(c) 57.8 parts of a compound which, in the form of the free acid, corresponds to formula

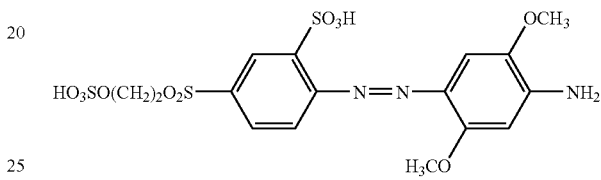

are suspended in 500 parts of water; 9.6 parts of sodium nitrite, 50 parts of water and 30 parts of concentrated hydrochloric acid are added and stirring is carried out for three hours at from 40 to 60° C. After excess nitrite has been destroyed using sulfamic acid, the suspension is added dropwise to the reaction mixture according to (b) and the pH value is maintained at from 5.5 to 6.5 using aqueous sodium hydroxide solution and stirring is carried out for 2 hours. After neutralisation, the reaction mixture is largely freed of salt by dialysis and concentrated in vacuo. The compound which, in the form of the free acid, corresponds to formula (101)

($\lambda$max=599 nm) is obtained and dyes cotton in a blue shade having good allround fastness properties.

EXAMPLES 2 to 9

The dyes indicated below, which dye cotton in blue shades having good allround fastness properties, can be obtained in a manner analogous to that described in Example 1.

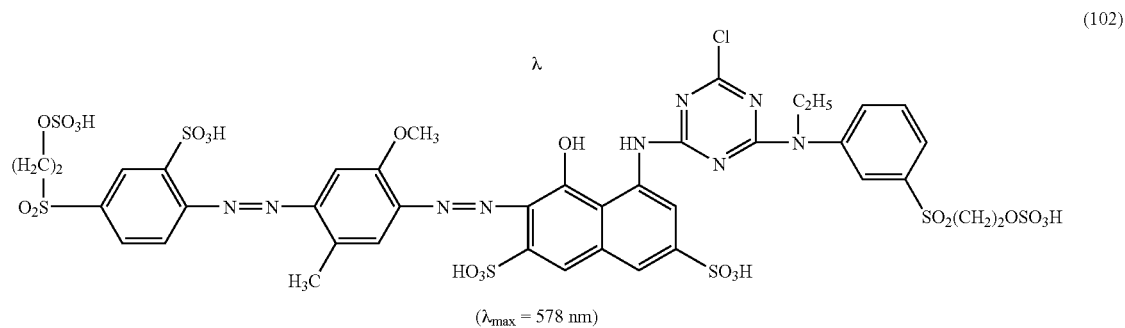
(102)
(λmax = 578 nm)
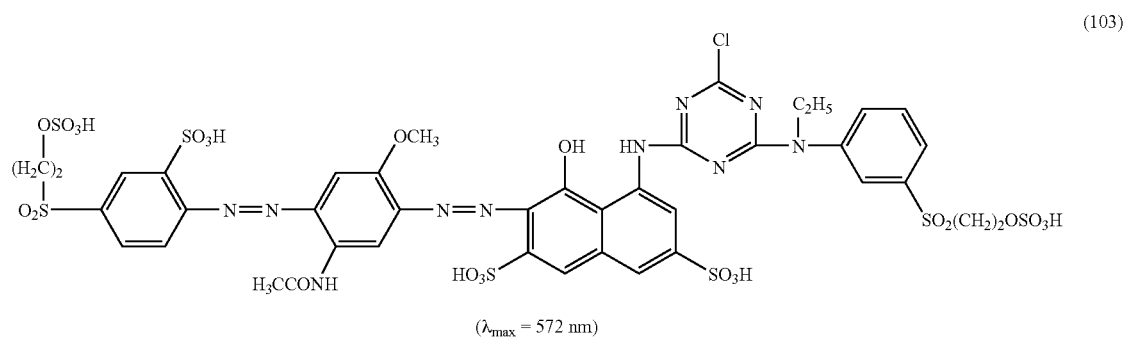
(103)
(λmax = 572 nm)
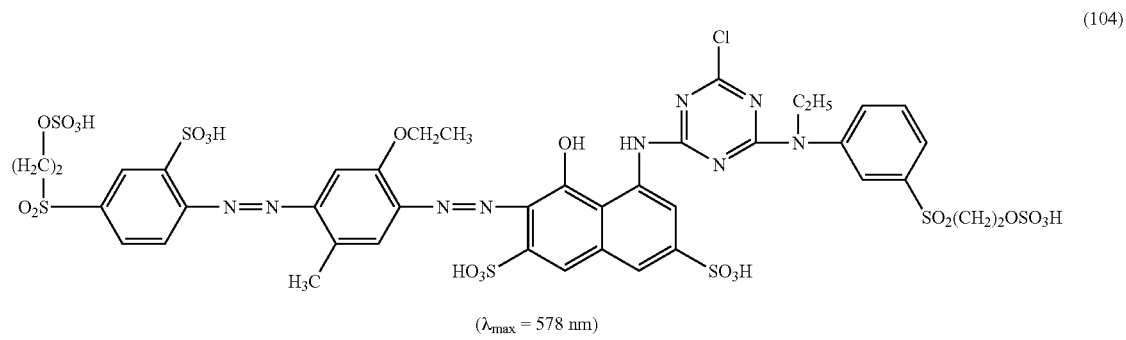
(104)
(λmax = 578 nm)
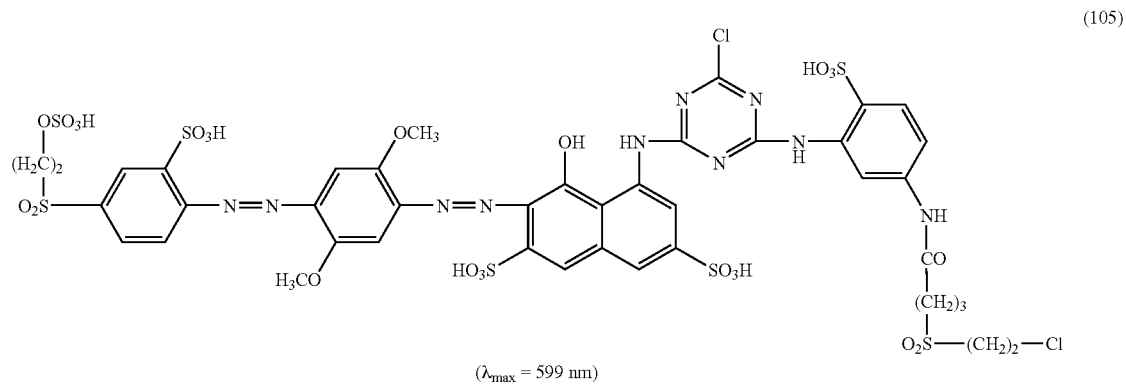
(105)
(λmax = 599 nm)

-continued
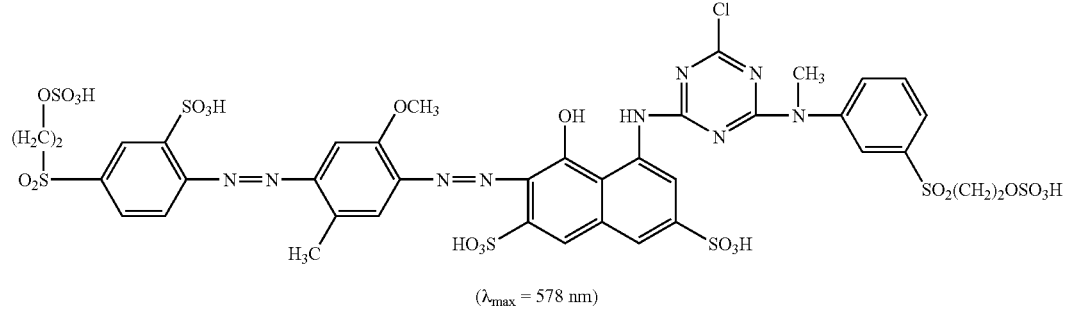
(106)
(λ_max = 578 nm)
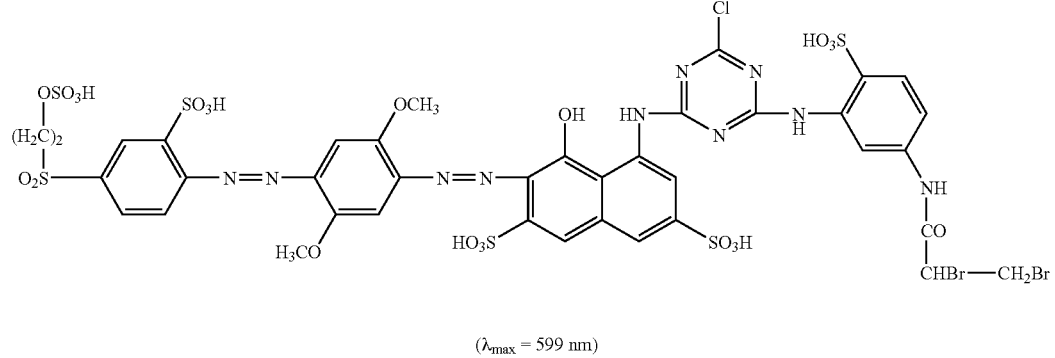
(107)
(λ_max = 599 nm)
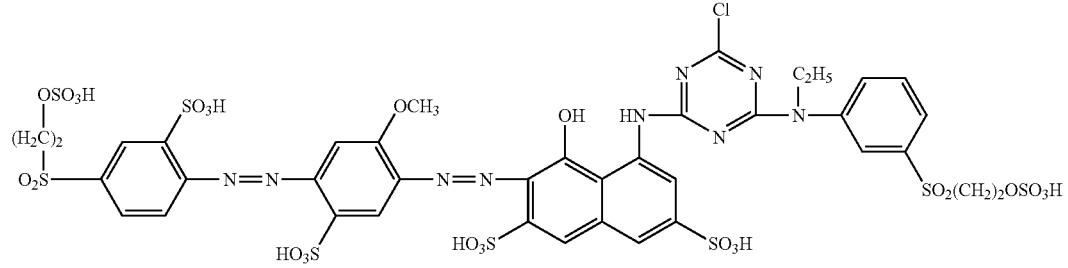
(108)
(λ_max = 553 nm)
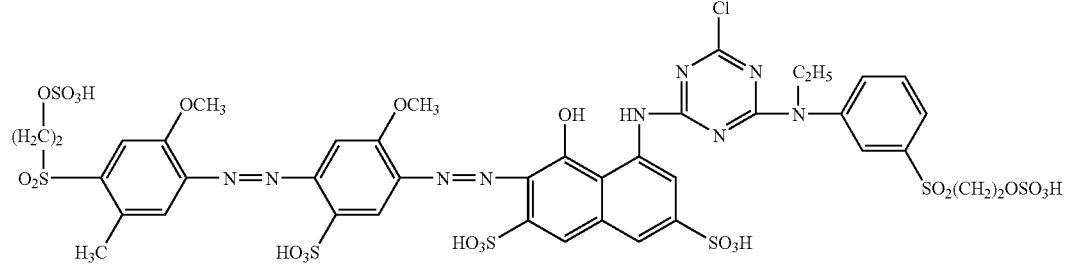
(109)
(λ_max = 592 nm)

Dyeing Procedure I 100 parts of cotton fabric are introduced at 80° C. into 1500 parts of a dye bath containing 45 g/l of sodium chloride and 2 parts of the reactive dye obtained according to Example 1. After 45 minutes at 80° C., 20 g/l of calcined soda are added. Dyeing is continued for a further 45 minutes at that temperature. The dyed goods are then rinsed, soaped at the boil for a quarter of an hour with a non-ionic detergent, rinsed again and dried.

As an alternative to the above procedure, the dyeing can be carried out at 60° C. instead of at 80° C.

Dyeing Procedure II 0.1 part of the dye according to Example 1 is dissolved in 200 parts of water, and 0.5 part of sodium sulfate, 0.1 part of a levelling adjuvant (based on the condensation product of a higher aliphatic amine and ethylene oxide) and also 0.5 part of sodium acetate are added. The pH is then adjusted to a value of 5.5 using acetic acid (80%). The dye bath is heated at 50° C. for 10 minutes and then 10 parts of a woollen fabric are added. Heating is then carried out in the course of approximately 50 minutes to a temperature of 100° C. and dyeing is carried out at that temperature for 60 minutes, after which the dye bath is allowed to cool to 90° C. and the dyed goods are removed. The woollen fabric is washed with hot and cold water, and is then spun and dried.

Printing Procedure I 3 parts of the dye obtained according to Example 1 are sprinkled, with rapid stirring, into 100 parts of a stock thickener containing 50 parts of 5% sodium alginate thickener, 27.8 parts of water, 20 parts of urea, 1 part of sodium m-nitrobenzenesulfonate and 1.2 parts of sodium hydrogen carbonate. The print paste so obtained is used to print a cotton fabric, and the resulting printed material is dried and steamed in saturated steam for 2 minutes at 102° C. The printed fabric is then rinsed, if desired soaped at the boil and rinsed again, and subsequently dried.

Printing procedure II (a) Mercerised cotton satin is pad-dyed with a liquor containing 30 g/l of sodium carbonate and 50 g/l of urea (70% liquor pick-up) and dried.

(b) Using a drop-on-demand ink-jet head (bubble jet), the cotton satin pretreated according to Step (a) is printed with an aqueous ink containing 15% by weight of the reactive dye of formula (101) according to Example 1, 15% by weight of 1,2-propylene glycol and 70% by weight of water.

The print is dried completely and fixed in saturated steam for 8 minutes at 102° C., cold-rinsed, washed off at the boil, rinsed again and dried.

What is claimed is:

1. A reactive dye of formula

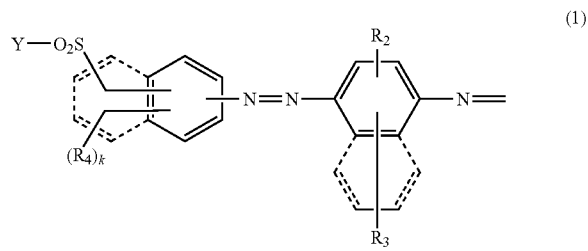

(1)

-continued

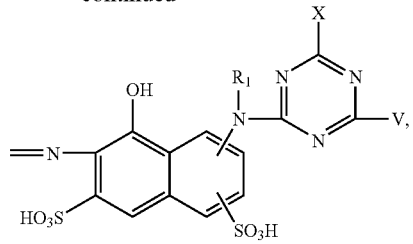

wherein $R_1$ is hydrogen or unsubstituted or substituted $C_1$-$C_4$ alkyl, $R_2$ is hydrogen; $C_1$-$C_4$ alkyl; $C_1$-$C_4$ alkoxy unsubstituted or substituted by sulfato, hydroxy or by $C_1$-$C_4$ alkoxy; halogen; carboxy or sulfo, $R_3$ is hydrogen; $C_1$-$C_4$ alkyl; $C_1$-$C_4$ alkoxy unsubstituted or substituted by sulfato, hydroxy or by $C_1$-$C_4$ alkoxy; halogen; nitro; $C_2$-$C_4$ alkanoylamino; ureido; carboxy or sulfo, $(R_4)_k$ denotes k identical or different substituents selected from the group halogen, $C_1$-$C_4$-alkyl, $C_1$-$C_4$ alkoxy, carboxy and sulfo, X is halogen and V is a radical of formula

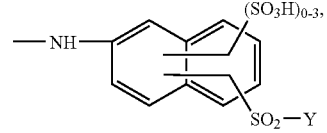

(2a)

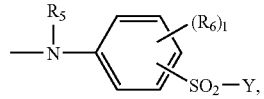

(2b)

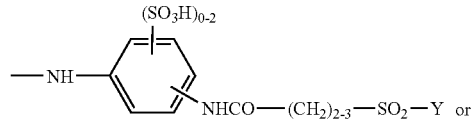

(2c)

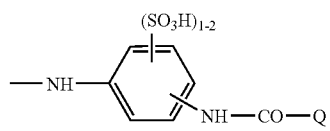

(2d)

wherein $R_5$ is unsubstituted or substituted $C_1$-$C_4$ alkyl, $(R_6)_l$ denotes l identical or different substituents from the group $C_1$-$C_4$ alkyl, $C_1$-$C_4$ alkoxy and sulfo, and l is the number 0, 1 or 2, Y is vinyl or a —$CH_2$—$CH_2$—U radical and U is a group that is removable under alkaline conditions, Q is a —CH(Hal)-$CH_2$-Hal or —C(Hal)=$CH_2$ group, Hal is halogen and k is the number 0, 1, 2 or 3.

2. A reactive dye according to claim 1, wherein $R_1$ is hydrogen.

3. A reactive dye according to claim 1, wherein X is chlorine or fluorine.

4. A reactive dye according to claim 1 that corresponds to formula

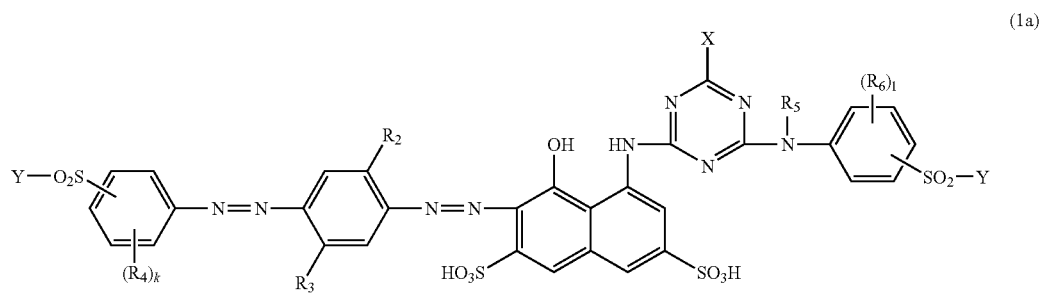

wherein
$R_2$ is hydrogen, $C_1$-$C_4$ alkyl, $C_1$-$C_4$ alkoxy or sulfo,
$R_3$ is hydrogen, $C_1$-$C_4$ alkyl, $C_1$-$C_4$ alkoxy, $C_2$-$C_4$ alkanoylamino, ureido or sulfo,
$(R_4)_k$ denotes k identical or different substituents from the group $C_1$-$C_4$ alkyl, $C_1$-$C_4$ alkoxy and sulfo,
$R_5$ is methyl or ethyl,
$(R_6)_l$ denotes l identical or different substituents from the group $C_1$-$C_4$ alkyl, $C_1$-$C_4$ alkoxy and sulfo,
X is chlorine or fluorine,
Y is vinyl, β-chloroethyl or β-sulfatoethyl and
k and l are each independently of the other the number 0, 1 or 2.

5. A process for the preparation of a reactive dye according to claim 1, wherein
(i) the compounds of formulae

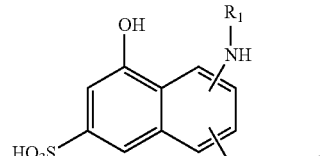

and

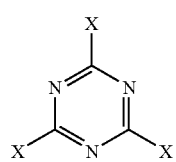

are reacted in any order with a cyanuric halide of formula (6)

$$\begin{array}{c} X \\ | \\ N{\nwarrow}{\nearrow}N \\ \| \quad \| \\ N{\searrow}{\swarrow}N \\ X \quad X \end{array}$$

to form a secondary condensation product of formula

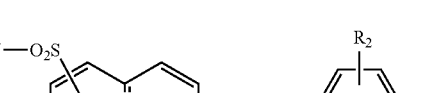

and
(ii) a compound of formula

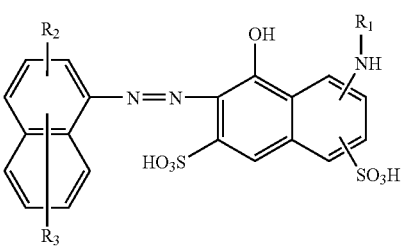

is diazotized and coupled to the secondary condensation product of formula (7) obtained according to (i); or
(iii) the compounds of formula (9)

and of the above formula (5) are reacted in any order with a cyanuric halide of the above formula (6) to form a secondary condensation product of formula

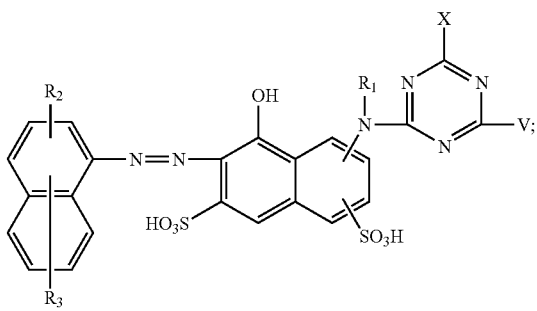

and
(iv) a compound of formula

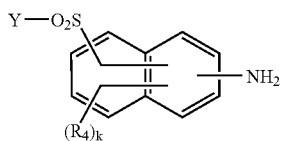

is diazotized and coupled to the secondary condensation product of formula (10) obtained according to (iii), $R_1$, $R_2$, $R_3$, $(R_4)_k$, V, X, Y and k each having the definitions given in claim 1.

6. An aqueous ink that comprises a reactive dye of formula (1) according to claim 1.

7. A process for printing textile fiber material, paper or plastics film which comprises spraying individual droplets of an aqueous ink onto a substrate from a nozzle in a controlled manner wherein the aqueous ink comprises the reactive dye according to claim 1.

8. A process for dyeing a fiber material comprising applying the reactive dye according to claim 1 to the fiber material and fixing the dye to the fiber material.

9. The process according to claim 8 wherein the fiber material is a hydroxyl-group-containing or nitrogen-containing fiber material.

10. The process according to claim 9 wherein the fiber material is cellulosic fiber material.

11. A recording system comprising the reactive dye according to claim 1.

* * * * *